United States Patent
Yanaka et al.

(10) Patent No.: US 10,557,941 B2
(45) Date of Patent: Feb. 11, 2020

(54) METHOD AND APPARATUS FOR INSPECTING POSITIONING MACHINE BY LASER TRACKING INTERFEROMETER

(71) Applicant: MITUTOYO CORPORATION, Kanagawa (JP)

(72) Inventors: Shinichirou Yanaka, Ibaraki (JP); Masayuki Nara, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 390 days.

(21) Appl. No.: 15/631,430

(22) Filed: Jun. 23, 2017

(65) Prior Publication Data
US 2018/0038960 A1 Feb. 8, 2018

(30) Foreign Application Priority Data
Aug. 3, 2016 (JP) .................. 2016-153262

(51) Int. Cl.
G01S 17/48 (2006.01)
G01S 7/48 (2006.01)
G01S 7/4912 (2020.01)

(52) U.S. Cl.
CPC ............ *G01S 17/48* (2013.01); *G01S 7/4808* (2013.01); *G01S 7/4912* (2013.01)

(58) Field of Classification Search
CPC .................. G01S 17/48; G01S 7/4808
See application file for complete search history.

(56) References Cited

U.S. PATENT DOCUMENTS

| 9,316,487 B2 | 4/2016 | Nara et al. |
| 9,335,186 B2 | 5/2016 | Nara |
| 2016/0313436 A1 | 10/2016 | Taketomi |

FOREIGN PATENT DOCUMENTS

| DE | 10 2007 004 934 B4 | 12/2010 |
| JP | S63-231286 A | 9/1988 |
| JP | 2007-57522 A | 3/2007 |

*Primary Examiner* — Hovhannes Baghdasaryan
(74) *Attorney, Agent, or Firm* — Greenblum & Bernstein, P.L.C.

(57) ABSTRACT

To inspect a positioning machine by a laser tracking interferometer that tracks a retroreflector using a laser beam, the positioning accuracy of the positioning machine is evaluated by comparing a distance $\Delta d_{ij,C}$ with a distance $\Delta d_{ij,L}$ measured by the laser tracking interferometer, the distance $\Delta d_{ij,C}$ being acquired by orthogonal projection of the position vectors of measurement points $p_i$ and $p_j$ measured by the positioning machine to the straight line $g_k$ passing through the rotation center M of the laser tracking interferometer.

14 Claims, 8 Drawing Sheets

PRIOR ART

METHOD AND APPARATUS FOR INSPECTING POSITIONING MACHINE BY LASER TRACKING INTERFEROMETER

CROSS-REFERENCE TO RELATED APPLICATION

The disclosure of Japanese Patent Application No. 2016-153262 filed on Aug. 3, 2016 including specifications, drawings and claims are incorporated herein by reference in its entirety.

TECHNICAL FIELD

The present invention relates to methods and apparatuses for inspecting a positioning machine by a laser tracking interferometer (also referred to as a laser tracker), and more particularly, to a method and an apparatus for inspecting a positioning machine by a laser tracking interferometer, the method and apparatus being suitably used for inspecting a machine having a positioning mechanism, such as a three-dimensional coordinate measuring machine (also referred to as the CMM), a machine tool, or a robot (collectively referred to as the positioning machine), by a laser tracking interferometer.

BACKGROUND ART

There is known a laser tracking interferometer which is configured from: a laser interferometer on which an optical axis shift detection sensor for detecting the amount of shift in the optical axis of return light is mounted; a biaxial rotation mechanism for directing the laser interferometer in an arbitrary direction; and a retroreflector that is secured to an object to be measured (see Japanese Patent Application Laid-Open. No. Sho. 63-231286 (hereafter referred to as Patent Literature 1) and Japanese Patent Application Laid-Open No. 2007-57522 (hereafter referred to as Patent Literature 2)). Here, the retroreflector is an optical element for collimating incident and reflected beams of light, and capable of interference measurement in a given direction by controlling the biaxial rotation mechanism so as to reduce the amount of shift in the optical axis to zero on the basis of an output from the optical axis shift detection sensor.

German Patent No. DE 102007004934 B4 (hereafter referred to as Patent Literature 3) describes a method for inspecting a geometric error of a positioning machine provided with a retroreflector using a laser tracking interferometer for measuring a distance by a laser beam that is rotatable to track the retroreflector, like those described above.

Referring to FIGS. 1 and 2, a description will be given of the technical outline of Patent Literature 3. Patent Literature 3 relates to a method for inspecting a geometric error of a positioning machine (herein, a CMM) 10 provided with a retroreflector 20 by a laser tracking interferometer 30 that measures a distance using a laser beam 32 rotatable to track the retroreflector 20.

FIG. 1 illustrates a base 12 of the positioning machine 10, a gate type frame 14 that is movable in the back-and-forth direction of the figure with respect to the base 12, a column 16 that is movable is the right-and-left direction along a horizontal beam 15 of the gate type frame 14, a slider 18 that is movable in the up-and-down direction with respect to the column 16, a personal computer (PC) 40, and communication cables 42 and 44. The tip end (the lower end in the figure) of the slider 18 is provided with a probe (for measurement) or the retroreflector 20 (for inspection).

As shown in FIGS. 1 and 2, claim 1 of Patent Literature 3 includes: a step of determining the coordinates of the rotation center M of the laser tracking interferometer 30 positioned in a work space of the positioning machine 10; a step of positioning the retroreflector 20 at at least two positions $p_i$ that are substantially positioned on a straight line $g_k$ extending through the rotation center M of the laser tracking interferometer 30, and detecting each of the coordinates of the retroreflector 20 by the positioning machine 10; a step of measuring, by the laser tracking interferometer 30, at least one distance difference $\Delta d_{ij,L}$ between distances $d_i$ from the at least two positions $p_i$ to the rotation center M, respectively; a step of computing at least one distance difference $\Delta d_{ij,C}$ from each of the coordinates of the retroreflector 20 measured by the positioning machine 10; and a step of comparing the at least one measured distance difference $\Delta d_{ij,L}$ with the at least one calculated distance difference $\Delta d_{ij,C}$ wherein a step of computing each coordinate vector $r_M$ of the rotation center M includes:

(A) a step of moving the retroreflector 20 to a first position;

(B) a step of measuring the distance to the retroreflector 20 using the laser tracking interferometer 30;

(C) a step of repeatedly executing the steps (A) and (B) described above at other positions until the position (coordinate) vector $r_M$ of the rotation center M can be determined; and (D) a step of computing each coordinate vector $r_M$ of the rotation center M from the measurement value of a measured distance.

Furthermore, claim 2 of Patent Literature 3 further specifies the method according to claim 1. The method is characterized in that the retroreflector 20 is moved to at least three positions and particularly, to four positions $P_i$, and the step (B) includes a step of using the laser tracking interferometer 30, when the retroreflector 20 is moved from one position $P_i$ to another position $P_j$, to measure the distances from the rotation center M to the at least three positions $P_i$ and measure a difference $\Delta d_{ij,L}$ between the measurement values, so that each coordinate vector $r_M$ of the rotation center M is determined by each measured distance difference $\Delta d_{ij,L}$ and the coordinate vector $P_i$ measured by the positioning machine 10.

SUMMARY OF INVENTION

Technical Problem

However, according to the inspecting method of Patent Literature 3, the measurement point $p_i$ not precisely placed on a certain straight line $g_k$ would not allow the pitch $\Delta d_{ij}$ along the straight line $g_k$ to be inspected with high accuracy.

That is, in the method according to Patent Literature 3, the following (Equation 1) is used to compute the distance difference $\Delta d_{ij,C}$ between two measurement points pi (here, expressed as $p_i$ and $p_j$), measured by the positioning machine 10, with the rotation center M at the origin.

$$\Delta d_{ij,C} = |\vec{p}_j - \vec{p}_i| \quad \text{(Equation 1)}$$

Furthermore, the distance difference $\Delta d_{ij,L}$ measured by the laser tracking interferometer 30 is computed as $$\Delta d_{ij,L} = |d_{j,L} - d_{i,L}| \quad \text{(Equation 2), and}$$

the error of the positioning machine 10 is considered as $$\Delta d_{ij,C} - \Delta d_{ij,L} \quad \text{(Equation 3).}$$

Thus, if the measurement points $p_i$ and $p_j$ that are the positions of the retroreflector 20 are precisely placed on a certain straight line $g_k$, the inspection is carried out with no problem by Equations 1 to 3. However, in actual measurements, even if the measurement points $p_i$ and $p_j$ are set on the straight line $g_k$, the measurement points may not be positioned precisely on the straight line $g_k$.

For simplicity's sake, suppose that as shown in FIG. 3, the measurement points $p_i$ and $p_j$ are such that $d_{i,L}=d_{j,L}=1000$ mm and $\Delta d_{ij,C}=|\text{vector } p_j-\text{vector } p_i|=10$ µm. Considering the error of the positioning machine 10 along the straight line $g_k$, the computation result of the error is desired to be 0 µm. However, since Equations 1 to 3 are used according to the conventional method of Patent Literature 3, the error $\Delta d_{ij,C}-\Delta_{ij,L}$ is inevitably computed to be 10 µm.

The present invention has been made to address the aforementioned conventional problems and provide improved accuracy of inspection of a positioning machine by a laser tracking interferometer.

Solution to Problem

The present invention addresses the aforementioned problems by a method for inspecting a positioning machine by a laser tracking interferometer that tracks a retroreflector using a laser beam. The method includes the steps of: mounting the retroreflector on the positioning machine; determining a position vector $r_M$ of a rotation center M of the laser tracking interferometer positioned in a work space of the positioning machine; positioning the retroreflector at at least two positions $p_i$ located in a vicinity of one straight line $g_k$ extending through the rotation center M of the laser tracking interferometer, and detecting each of position vectors $p_i$ of the retroreflector by the positioning machine; measuring a distance $d_{i,L}$ from each of the at least two positions $p_i$ to the rotation center M using the laser tracking interferometer and computing at least one distance difference $\Delta d_{ij,L}$ from a difference between the at least two distances $d_{i,L}$; performing coordinate transformation of each of the position vectors $p_i$ of the retroreflector to a position vector $p'_i$ with the rotation center M at the origin; calculating a distance $d_{i,C}$ acquired by orthogonal projection of each of the at least two position vectors $p'_i$ to a unit direction vector $g_k$ of the straight line $g_k$; computing at least one distance difference $\Delta d_{ij,C}$ from the at least two distances $d_{i,C}$; and comparing the at least one distance difference $\Delta d_{ij,L}$ measured by the laser tracking interferometer with the at least one distance difference $\Delta d_{ij,C}$ measured by the positioning machine.

Here, the step of determining the position vector $r_M$ of the rotation center M includes the steps of: (a) moving the retroreflector to a desired position $P_i$; (b) measuring a position vector $P_i$ of the retroreflector by the positioning machine; (c) measuring the distance $d_{i,L}$ to the retroreflector by the laser tracking interferometer; and (d) repeating the steps (a) to (c) at at least a total of four positions until the position $P_i$ of the retroreflector is changed and then the position vector $r_M$ of the rotation center M of the laser tracking interferometer can be computed, so that the position vector $r_M$ of the rotation center M of the laser tracking interferometer can be determined from the distance $d_{i,L}$ and the position vector $P_i$ which have been measured.

Furthermore, the present invention also addresses the aforementioned problems by an apparatus for inspecting a positioning machine, to which a retroreflector is mounted, by a laser tracking interferometer for tracking the retroreflector using a laser beam. The apparatus includes: a circuit for determining a position vector $r_M$ of a rotation center M of the laser tracking interferometer positioned in a work space of the positioning machine; a circuit for positioning the retroreflector at at least two positions $p_i$ located in a vicinity of one straight line $g_k$ extending through the rotation center M of the laser tracking interferometer, and detecting each of position vectors $p_i$ of the retroreflector by the positioning machine; a circuit for measuring a distance $d_{i,L}$ from each of the at least two positions $p_i$ to the rotation center M using the laser tracking interferometer and computing at least one distance difference $\Delta d_{ij,L}$ from a difference between the at least two distances $d_{i,L}$; a circuit for performing coordinate transformation of each of the position vectors $p_i$ of the retroreflector to a position vector $p'_i$ with the rotation center M at the origin; a circuit for calculating a distance $d_{i,C}$ acquired by orthogonal projection of each of the at least two position vectors $p'_i$ to a unit direction vector $g_k$ of the straight line $g_k$; a circuit for computing at least one distance difference $\Delta d_{ij,C}$ from the at least two distances $d_{i,C}$; and a circuit for comparing the at least one distance difference $\Delta d_{ij,L}$ measured by the laser tracking interferometer with the at least one distance difference $\Delta d_{ij,C}$ measured by the positioning machine.

Here, the circuit for determining the position vector $r_M$ of the rotation center M includes: (a) a circuit for moving the retroreflector to a desired position $P_i$; (b) a circuit for measuring a position vector $P_i$ of the retroreflector by the positioning machine; (c) a circuit for measuring the distance $d_{i,L}$ to the retroreflector by the laser tracking interferometer; and (d) a circuit for repeating the steps (a) to (c) at at least a total of four positions until the position $P_i$ of the retroreflector is changed and then the position vector $r_M$ of the rotation center M of the laser tracking interferometer can be computed, so that the position vector $r_M$ of the rotation center M of the laser tracking interferometer can be determined from the distance $d_{i,L}$ and the position vector $P_i$ which have been measured.

Furthermore, as the value of the position vector $P_i$, it is possible to employ a pre-specified command value in place of a measurement value by the positioning machine.

Furthermore, of the at least total of four positions, at least one position may be a position that is not present on the same plane.

Furthermore, the distance difference $\Delta d_{ij,C}$ may be computed by orthogonal projection of a vector of a difference between the respective position vectors $p'_i$ of the retroreflector to the unit direction vector $g_k$ of the straight line $g_k$.

Furthermore, the position vector $p_i$ or $P_i$ of the retroreflector may be measured by the positioning machine while the retroreflector is being moved.

Furthermore, the positioning machine may be a three-dimensional coordinate measuring machine (CMM).

Advantageous Effects of Invention

The present invention allows a geometric accuracy inspection of a positioning machine to be performed with high accuracy along a straight line $g_k$, even when measurement points $p_i$ are not exactly disposed on the straight line $g_k$. This is implemented by comparing a distance $\Delta d_{ij,C}$ with a distance $\Delta d_{ij,L}$ measured by a laser tracking interferometer, the distance $\Delta d_{ij,C}$ having been acquired by orthogonal projection of a position vector $p_i$ of a measurement point measured by the positioning machine to the straight line $g_k$ passing through the rotation center M of the laser tracking interferometer.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

Embodiments of the present invention will be described below in detail with reference to the drawings. It should be noted that the present invention is not limited to the contents described in the following embodiments and practical examples. The components of the embodiments and practical examples described below may include ones easily conceivable by those skilled in the art, substantially identical ones, and ones within the range of equivalency. The components disclosed in the embodiments and practical examples described below may be combined as appropriate, and may be selected and used as appropriate.

Figure 1:
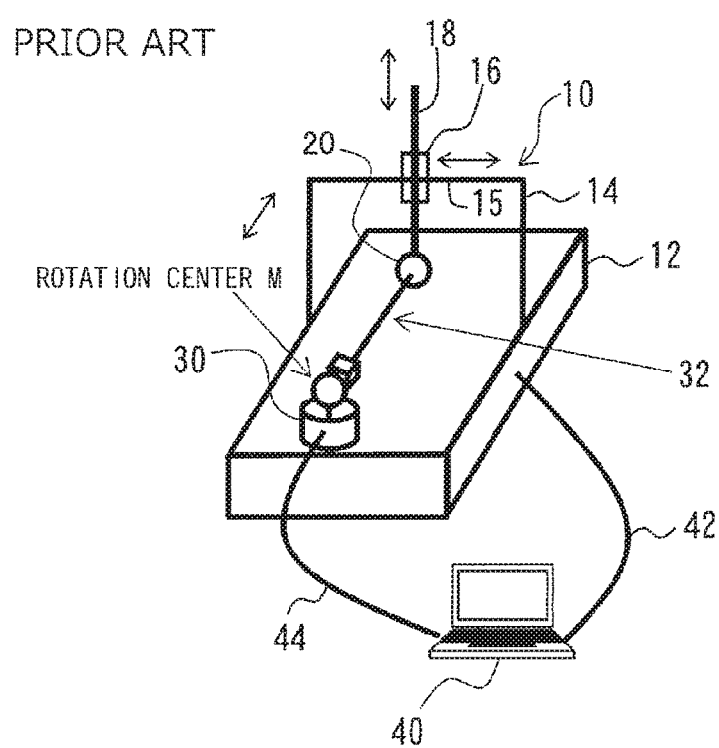
FIG. 1 is an explanatory schematic perspective view illustrating the inspecting method disclosed in Patent Literature 3 and an applicable target of an embodiment of the present invention.
Figure 2:
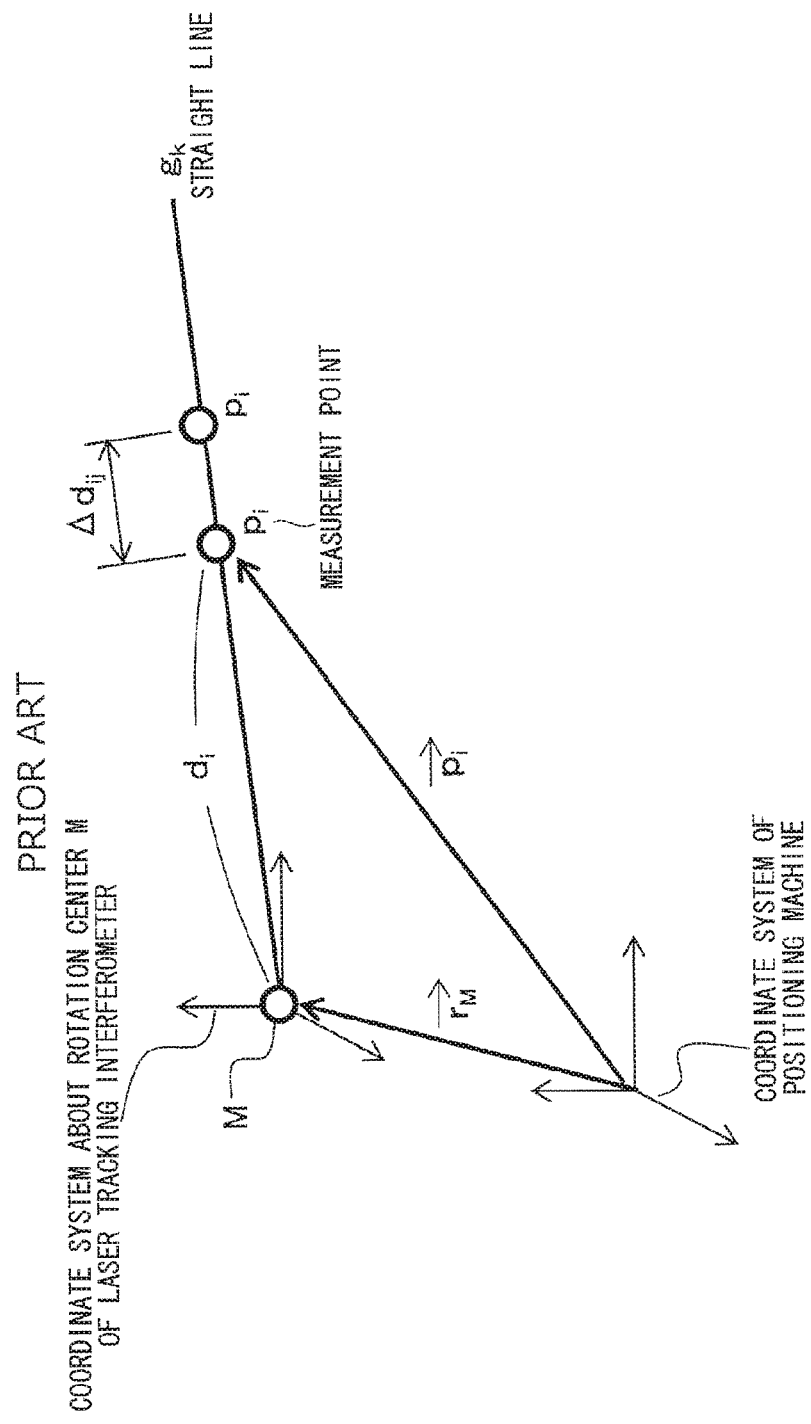
FIG. 2 is a view illustrating a method for computing an error in the inspecting method disclosed in Patent Literature 3.

The applicable target of the embodiment of the present invention is the same as that of the conventional technique disclosed in Patent Literature 3. That is, as shown in FIG. 1, an apparatus is used in which a laser tracking interferometer 30 is positioned within the work space of a positioning machine (OEM) 10 on which the retroreflector 20 is mounted (the range in which a slider 18 on a base 12 is operated, and the surrounding thereof); to acquire a position vector $p_i$ of the retroreflector 20 measured by the positioning machine 10 into a PC 40, the PC 40 and the positioning machine 10 are connected together by a communication cable 42 such as a USB or LAN; and to acquire a distance $d_{i,L}$ to the retroreflector 20 measured by the laser tracking interferometer 30 into the PC 40, the PC 40 and the laser tracking interferometer 30 are connected together by a communication cable 44 such as a USB or LAN.

The PC 40 includes a data storage device (not shown) in which measurement results or a program for controlling the CMM 10 are stored.

Figure 4:
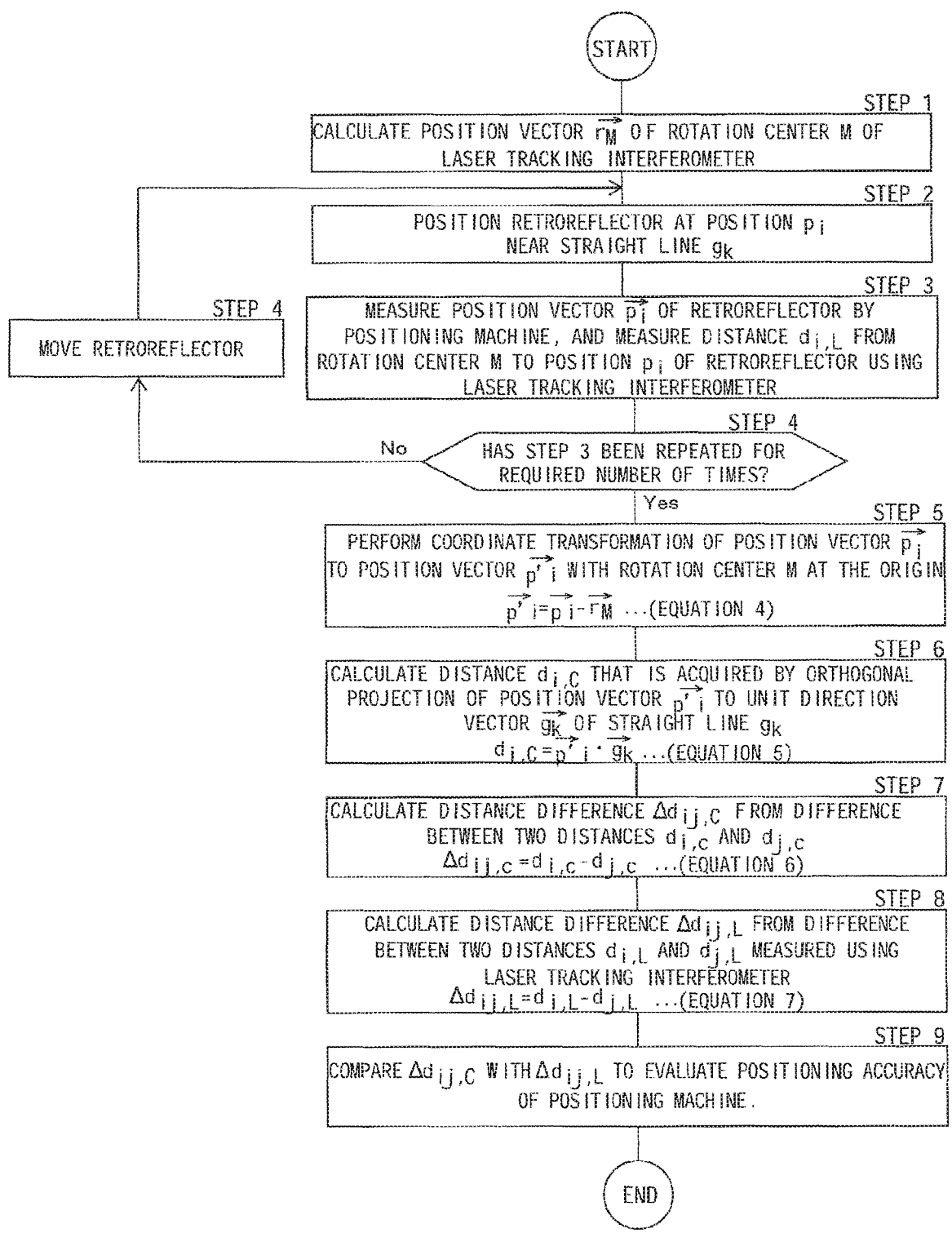
FIG. 4 is a flowchart of the entire procedure is an embodiment of the present invention.

In the embodiment of the present invention, as the entire procedure is shown in FIG. 4, Steps 1 to 9 below will be followed to inspect the geometric accuracy of the positioning machine 10.

Figure 5:
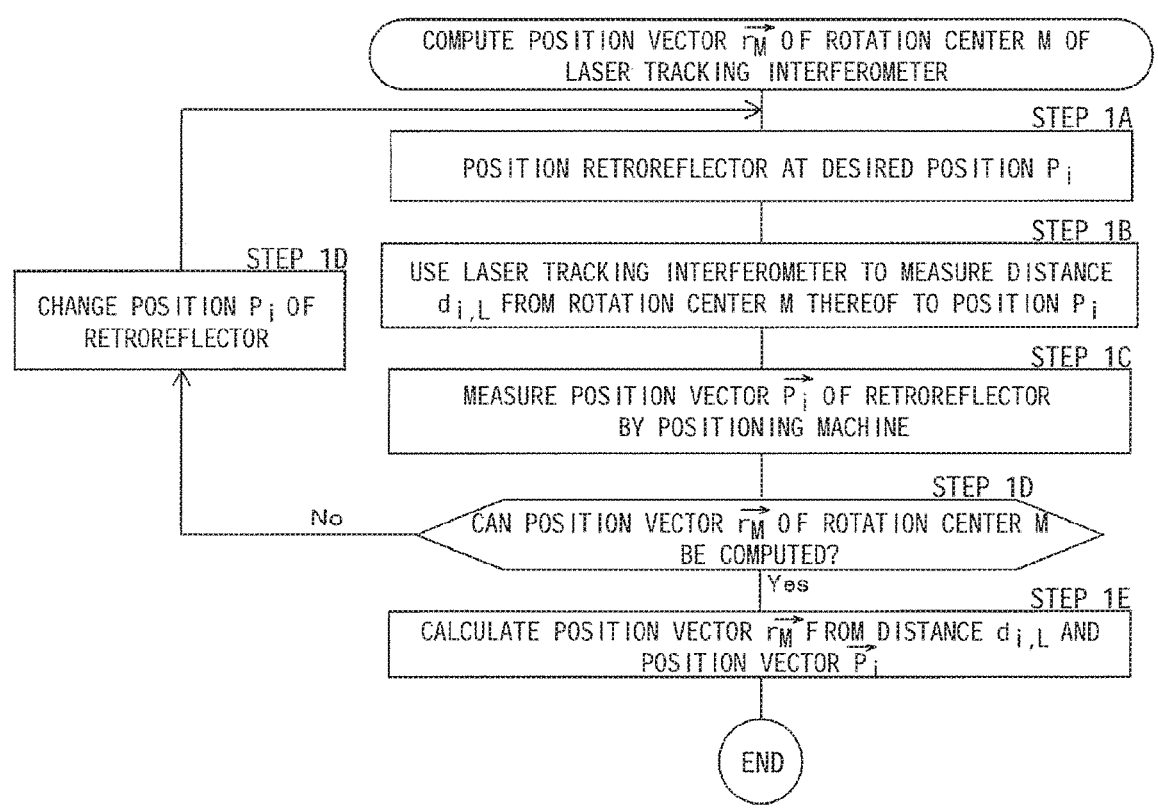
FIG. 5 is a flowchart of the procedure for computing a position vector of the rotation center of the laser tracking interferometer in the embodiment of the present invention.

(Step 1) As the procedure is shown in FIG. 5, Steps 1A to 1E below will be followed to compute a position vector $r_M$ of the rotation center M of the laser tracking interferometer 30.

Figure 6:
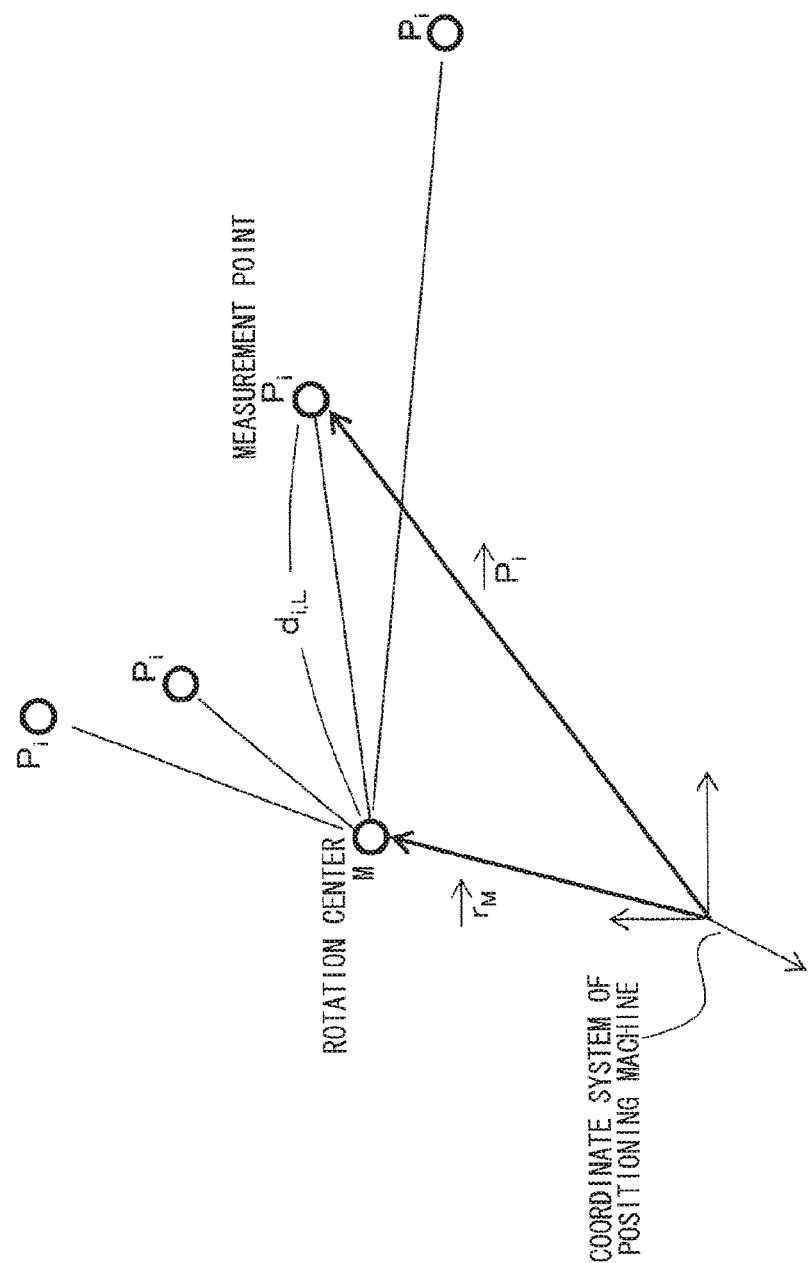
FIG. 6 is a view schematically illustrating measurement points in the embodiment of the present invention.

(Step 1A) As illustrated in FIG. 6, the retroreflector 20 is first positioned at a desired position $P_i$.

(Step 1B) Subsequently, the laser tracking interferometer 30 is used to measure the distance $d_{i,L}$ from the rotation center M of the laser tracking interferometer 30 to the position $P_i$.

(Step 1C) The positioning machine 10 is used to measure the position vector $P_i$ of the retroreflector 20.

(Step 1D) Step 1A to Step 1D are repeatedly carried out for at least a total of four positions $P_i$ while the position $P_i$ of the retroreflector 20 is being varied, until the position vector $r_M$ of the rotation center M can be computed.

(Step 1E) The position vector $r_M$ of the rotation center M is computed from the distance $d_{i,L}$ and the position vector $P_i$ which have been measured.

Here, as for the positions $P_i$ of the retroreflector 20, it is necessary to select at least one point that is a position not on the same plane because the position vector $r_M$ of the rotation center M cannot be computed if all the positions $P_i$ are on the same plane.

After Step 1E of FIG. 5 is ended, the process returns to Step 2 of FIG. 4 and executes Steps 2 to 9 below.

Figure 7:
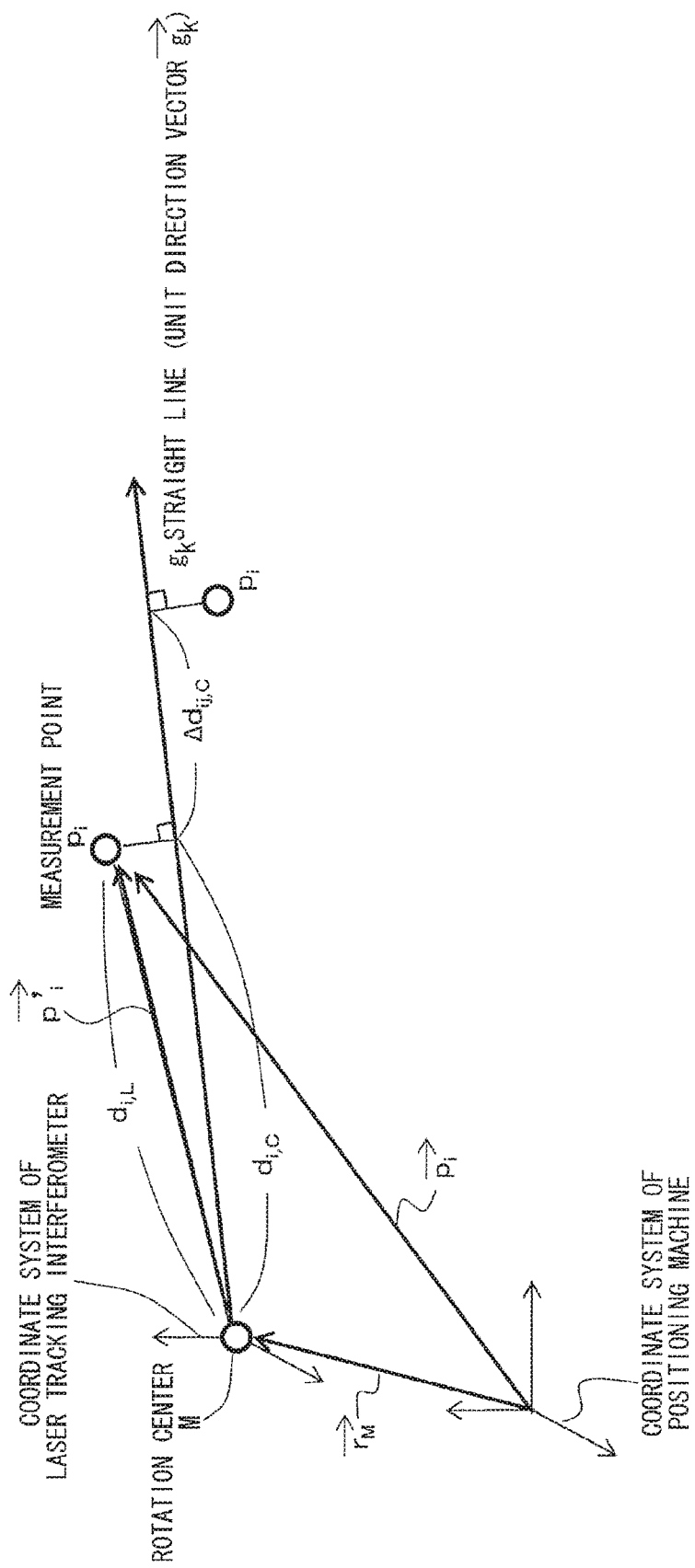
FIG. 7 is a view schematically illustrating as operation of the embodiment of the present invention.

(Step 2) As illustrated in FIG. 7, the process computes the unit direction vector $g_k$ of one straight line $g_k$ that extends, in a direction in which the inspection is to be carried out, through the rotation center M of which position vector $r_M$ was computed in Step 1, and then the retroreflector 20 is positioned at the position $p_i$ in the vicinity of the straight, line $g_k$.

(Step 3) The position vector $p_i$ of the retroreflector 20 is measured by the positioning machine 10, and the laser tracking interferometer 30 is used to measure the distance $d_{i,L}$ from the rotation center M to the position $p_i$ of the retroreflector 20.

(Step 4) The retroreflector 20 is moved to another position in the vicinity of the straight line $g_k$, and then the process conducts Steps 2 to 3 again. The retroreflector 20 is moved and measured repeatedly for a required number of times.

(Step 5) At least two position vectors $p_i$ measured by the positioning machine 10 are each changed by coordinate transformation to the position vector $p'_i$ with the rotation center M at the origin.

$$\vec{p}'_i = \vec{p}_i - \vec{r}_M \quad \text{(Equation 4)}$$

(Step 6) The process calculates distances $d_{i,C}$, acquired by orthogonal projection of the at least two positon vectors $p'_i$ to the unit direction vectors $g_k$ of the straight line $g_k$ for the respective position vectors $p'_i$.

$$d_{i,C} = \vec{p}'_i \cdot \vec{g}_k \quad \text{(Equation 5)}$$

(wherein the sign "·" means "inner product")

(Step 7) The process computes at least one distance difference $\Delta d_{ij,C}$ from the difference between the at least two distances $d_{i,C}$ and $d_{j,C}$.

$$\Delta d_{ij,C} = d_{i,C} - d_{j,C} \quad \text{(Equation 6)}$$

(Step 8) The process computes at least one distance difference $\Delta d_{ij,L}$ from the difference between the at least two distances $d_{i,L}$ and $d_{j,L}$ measured in step 3 using the laser tracking interferometer 30.

$$\Delta d_{ij,L} = d_{i,L} - d_{j,L} \quad \text{(Equation 7)}$$

(Step 9) The process compares the at least one distance difference $\Delta d_{ij,C}$ measured by the positioning machine 10 with the at least one distance difference $\Delta d_{ij,L}$ measured using the laser tracking interferometer 30, thereby evaluating the positioning accuracy of the positioning machine 10.

Figure 3:
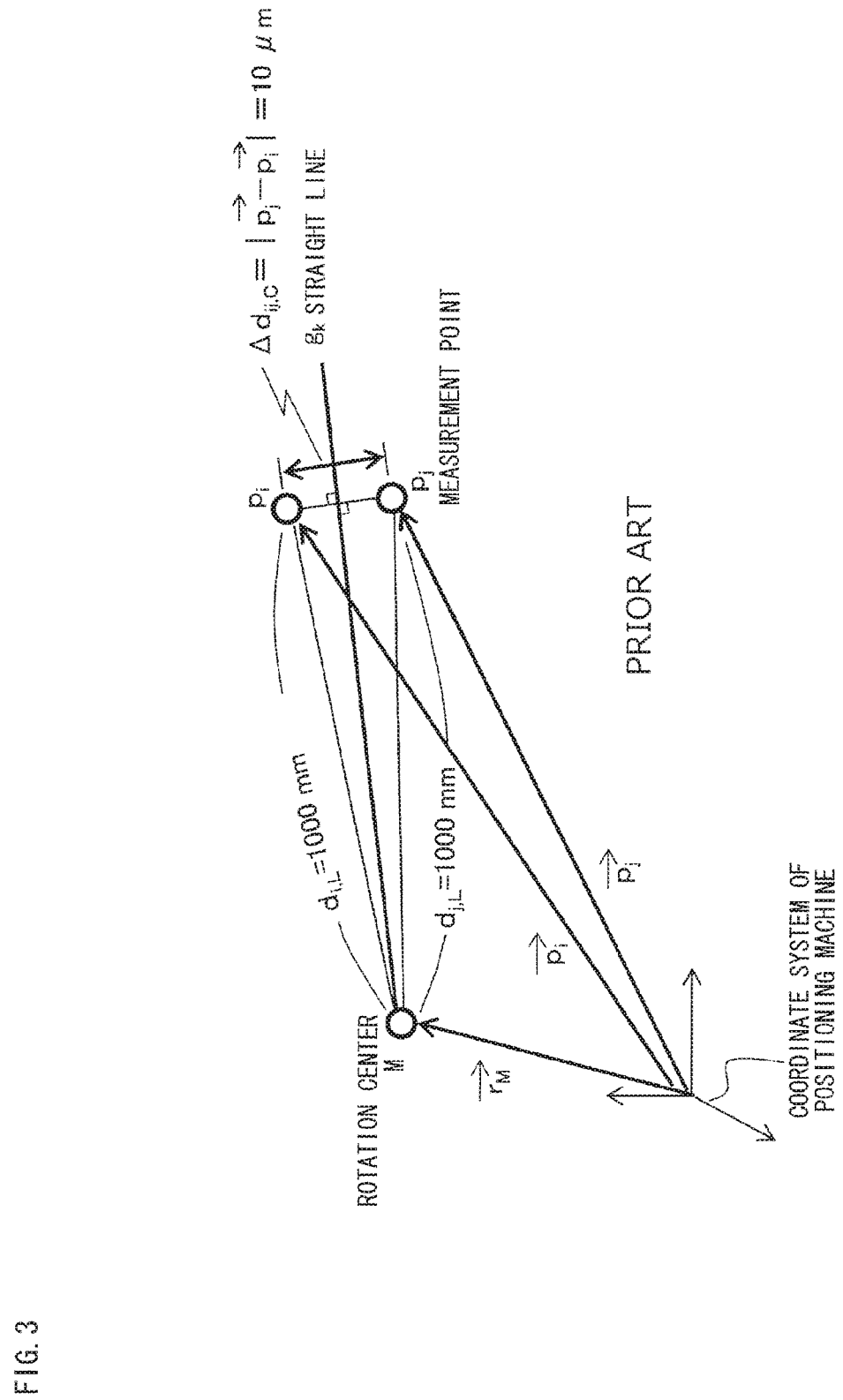
FIG. 3 is a view illustrating a problem of the aforementioned method for computing an error.

In the case as shown in FIG. 3, when the aforementioned method is used, the computation result of the error of the positioning machine 10 along the straight line $g_k$ is 0 µm, and the method is thus capable of performing inspection with improved accuracy as compared with the method disclosed in Patent Literature 3.

Note that a laser interferometer to be mounted on the laser tracking interferometer 30 may be of either the incremental type or the absolute type.

Furthermore, in Step 1, the position vector $P_i$ employs a value measured by the positioning machine 10. However, it is also possible to employ a pre-specified command value instead.

Furthermore, the measurement of the position vector $p_i$ by the positioning machine 10 in Step 2 may be performed in synchronism with the measurement of the distance $d_{i,L}$ by the laser tracking interferometer 30 in Step 3, thereby performing these measurements while the retroreflector 20 is being moved.

Furthermore, to set the straight line $g_k$ in an arbitrary direction, a plane mirror may be used to change the direction of a laser beam 32 emitted from the laser tracking interferometer 30 for inspection.

Furthermore, in place of the measurement of the distance $d_{i,L}$ by the laser tracking interferometer 30 in Step 3, the distance difference $\Delta d_{ij,L}$ may be directly measured.

Furthermore, when the distance difference $\Delta d_{ij,C}$ is computed in Step 6 and step 7, the distance difference $\Delta d_{ij,C}$ is computed from the distances $d_{i,C}$ that are acquired by orthogonal projection of the position vectors $p'_i$ to the unit direction vectors $g_k$ of the straight line $g_k$. However, the distance difference $\Delta d_{ij,C}$ may be computed by computing the vector $\Delta p'_{ij}$ of the difference between the position vectors of two points and subjecting it to the orthogonal projection to the unit direction vector $g_k$.

Figure 8:
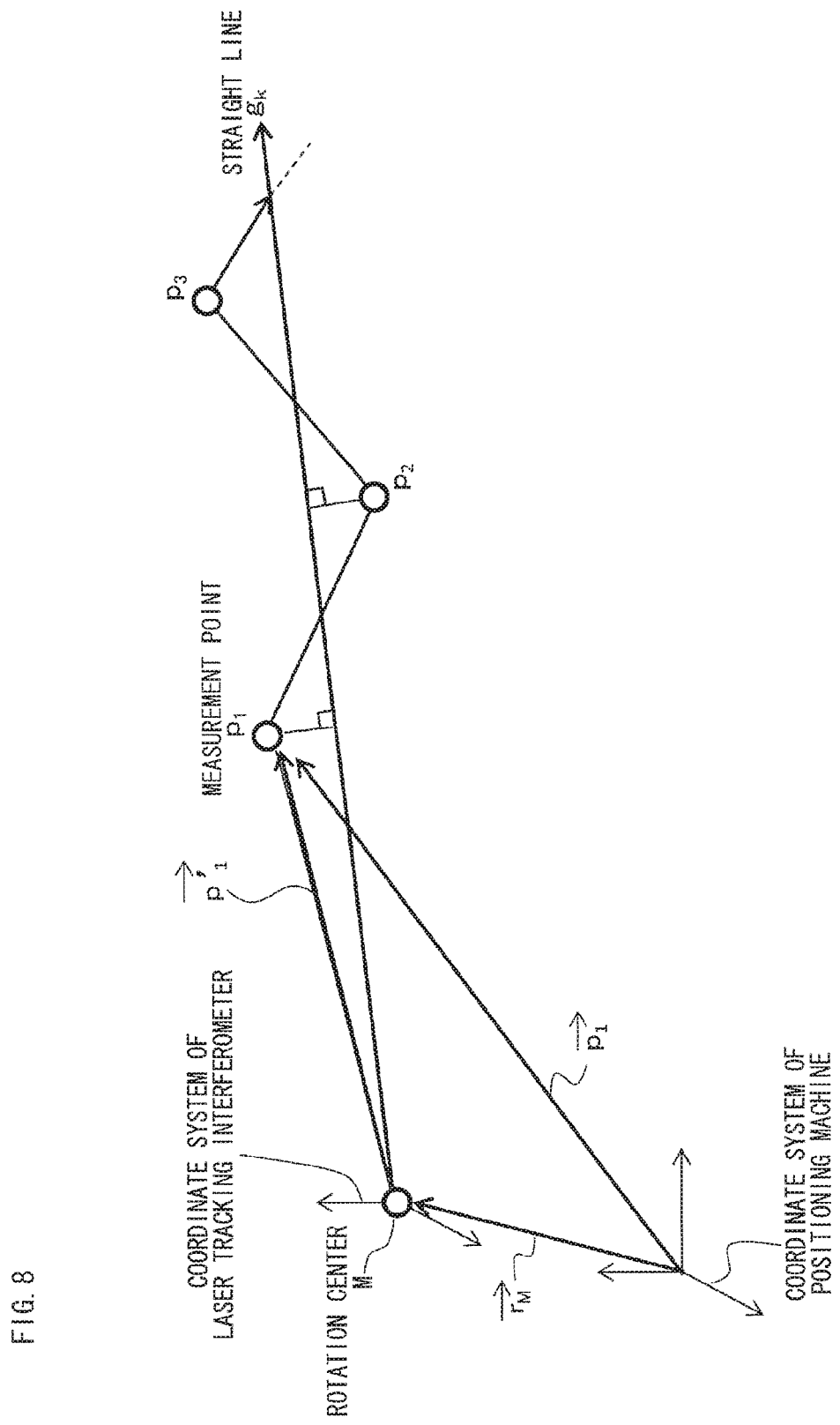
FIG. 8 is a view schematically illustrating an example to which the present invention is effective.

As shown in FIG. 8, when measurements are performed, for example, from a certain point $p_1$ sequentially in the order of $p_1$ to $p_2$, and $p_2$ to $p_3$, the vectors $p_1$ to $p_2$, $p_2$ to $p_3$, and ... have a high gradient to the straight line $g_k$, and thus the present invention provides significant effects.

Note that in the embodiments mentioned above, the positioning machine 10 was a CMM having a gate type frame. However, the type of the positioning machine is not limited thereto, and may also be another type of CMM having a cantilever type frame, a machine tool, a robot, or the like.

It should be apparent to those skilled in the art that the above-described embodiments are merely illustrative which represent the applicable examples of the principles of the present invention. Numerous and varied other examples can be readily devised by those skilled in the art without departing from the spirit and the scope of the present invention.

The invention claimed is:

1. A method for inspecting a positioning machine by a laser tracking interferometer that tracks a retroreflector using a laser beam, the method comprising:
   mounting the retroreflector on the positioning machine;
   determining a position vector $r_M$ of a rotation center M of the laser tracking interferometer positioned in a work space of the positioning machine;
   positioning the retroreflector at least two positions $p_i$ located in a vicinity of one straight line $g_k$ extending through the rotation center M of the laser tracking interferometer, and detecting each of position vectors $p_i$ of the retroreflector by the positioning machine;
   measuring a distance $d_{i,L}$ from each of the at least two positions $p_i$ to the rotation center M using the laser tracking interferometer and computing at least one distance difference $\Delta d_{ij,L}$ from a difference between the at least two distances $d_{i,L}$;
   performing coordinate transformation of each of the position vectors $p_i$ of the retroreflector to a position vector $p'_i$ with the rotation center M at an origin;
   calculating a distance $d_{i,C}$ acquired by orthogonal projection of each of the at least two position vectors $p'_i$ to a unit direction vector $g_k$ of the straight line $g_k$;
   computing at least one distance difference $\Delta d_{ij,C}$ from the at least two distances $d_{i,C}$; and
   comparing the at least one distance difference $\Delta d_{ij,L}$ measured by the laser tracking interferometer with the at least one distance difference $\Delta d_{ij,C}$ measured by the positioning machine.

2. The method according to claim 1, wherein:
said determining the position vector $r_M$ of the rotation center M includes:
   (a) moving the retroreflector to a desired position $P_i$;
   (b) measuring a position vector $P_i$ of the retroreflector by the positioning machine;
   (c) measuring the distance $d_{i,L}$ to the retroreflector by the laser tracking interferometer; and
   (d) repeating (a) to (c) at at least a total of four positions until the position $P_i$, of the retroreflector is changed and then the position vector $r_M$ of the rotation center M of the laser tracking interferometer can be computed, so that the position vector $r_M$ of the rotation center M of the laser tracking interferometer is determined from the distance $d_{i,L}$ and the position vector $P_i$ which have been measured.

3. The method according to claim 2, wherein a pre-specified command value is employed as a value of the position vector $P_i$ in place of a measurement value by the positioning machine.

4. The method according to claim 2, wherein, of the at least total of four positions, at least one position is not present on a same plane.

5. The method according to claim 1, wherein the distance difference $\Delta d_{ij,C}$ is computed by orthogonal projection of a vector of a difference between the respective position vectors $p'_i$ of the retroreflector to the unit direction vector $g_k$ of the straight line $g_k$.

6. The method according to claim 1, wherein the position vector $p_i$ of the retroreflector is measured by the positioning machine while the retroreflector is being moved.

7. The method according to claim 1, wherein the positioning machine is a three-dimensional coordinate measuring machine (CMM).

8. An apparatus for inspecting a positioning machine, to which a retroreflector is mounted, by a laser tracking interferometer for tracking the retroreflector using a laser beam, the apparatus comprising:
   a circuit that determines a position vector $r_M$ of a rotation center M of the laser tracking interferometer positioned in a work space of the positioning machine;
   a circuit that positions the retroreflector at at least two positions $p_i$ located in a vicinity of one straight line $g_k$ extending through the rotation center M of the laser tracking interferometer, and that detects each of position vectors $p_i$ of the retroreflector by the positioning machine;

a circuit that measures a distance $d_{i,L}$ from each of the at least two positions $p_i$ to the rotation center M using the laser tracking interferometer, and that computes at least one distance difference $\Delta d_{ij,L}$ from a difference between the at least two distances $d_{i,L}$;

a circuit that performs coordinate transformation of each of the position vectors $p_i$ of the retroreflector to a position vector $p'_i$ with the rotation center M at an origin;

a circuit that calculates a distance $d_{i,C}$ acquired by orthogonal projection of each of the at least two position vectors $p'_i$ to a unit direction vector $g_k$ of the straight line $g_k$;

a circuit that computes at least one distance difference $\Delta d_{ij,C}$ from the at least two distances $d_{i,C}$; and a circuit for comparing that compares the at least one distance difference $\Delta d_{ij,L}$ measured by the laser tracking interferometer with the at least one distance difference $\Delta d_{ij,C}$ measured by the positioning machine.

9. The apparatus according to claim 8, wherein the circuit that determines the position vector $r_M$ of the rotation center M includes:

(a) a circuit that moves the retroreflector to a desired position $P_i$;

(b) a circuit that moves a position vector $P_i$ of the retroreflector by the positioning machine;

(c) a circuit that measures the distance $d_{i,L}$ to the retroreflector by the laser tracking interferometer; and (d) a circuit that repeats (a) to (c) at at least a total of four positions until the position $P_i$ of the retroreflector is changed and then the position vector $r_M$ of the rotation center M of the laser tracking interferometer can be computed, so that the position vector $r_M$ of the rotation center M of the laser tracking interferometer is determined from the distance $d_{i,L}$ and the position vector $P_i$ which have been measured.

10. The apparatus according to claim 9, wherein a pre-specified command value is employed as a value of the position vector $P_i$ in place of a measurement value by the positioning machine.

11. The apparatus according to claim 9, wherein, of the at least total of four positions, at least one position is not present on a same plane.

12. The apparatus according to claim 8, wherein the distance difference $\Delta d_{ij,C}$ is computed by orthogonal projection of a vector of a difference between the respective position vectors $p'_i$ of the retroreflector to the unit direction vector $g_k$ of the straight line $g_k$.

13. The apparatus according to claim 8, wherein the position vector $p_i$ of the retroreflector is measured by the positioning machine while the retroreflector is being moved.

14. The apparatus according to claim 8, wherein the positioning machine is a three-dimensional coordinate measuring machine (CMM).

* * * * *